US 6,624,744 B1

United States Patent
Wilson et al.

(10) Patent No.: US 6,624,744 B1
(45) Date of Patent: Sep. 23, 2003

(54) GOLF CART KEYLESS CONTROL SYSTEM

(76) Inventors: William Neil Wilson, 215 Devereux Ct., Easley, SC (US) 29642; Lars William Johnson, 203 S. Lady Slipper La., Greer, SC (US) 29650

( * ) Notice: Subject to any disclaimer, the term of this patent is extended or adjusted under 35 U.S.C. 154(b) by 0 days.

(21) Appl. No.: 09/972,068

(22) Filed: Oct. 5, 2001

(51) Int. Cl.[7] .................................................. G08B 1/00
(52) U.S. Cl. ............................ 340/309.15; 340/691.8; 340/5.28; 340/5.22; 340/5.23; 701/36; 180/287
(58) Field of Search ........................ 340/309.16, 323 R, 340/5.2, 5.27, 5.28, 5.22, 5.23, 5.24, 5.25, 309.7, 691.8; 701/29, 30, 32, 35, 36; 180/287; 384/5.31, 5.72; 307/5.65, 10.1; 473/131

(56) References Cited

U.S. PATENT DOCUMENTS

| | | | |
|---|---|---|---|
| 4,472,952 A | | 9/1984 | Hollowell, Jr. |
| 4,805,722 A | * | 2/1989 | Keating et al. ............. 180/287 |
| 5,438,319 A | * | 8/1995 | Zeytoonjian et al. ....... 340/571 |
| 5,610,586 A | * | 3/1997 | Zeytoonjian et al. ....... 340/571 |
| 5,686,765 A | * | 11/1997 | Washington ............... 307/10.5 |
| 5,719,555 A | * | 2/1998 | Zeytoonjian et al. ....... 340/571 |
| 5,764,888 A | | 6/1998 | Bolan et al. |
| 5,812,070 A | * | 9/1998 | Tagami et al. ............ 340/932.2 |
| 6,021,494 A | | 2/2000 | Bolan et al. |
| 6,154,694 A | * | 11/2000 | Aoki et al. ................... 701/35 |
| 6,169,650 B1 | * | 1/2001 | Abrecht ...................... 361/171 |
| 6,177,879 B1 | * | 1/2001 | Kokubu et al. ........ 340/825.33 |
| 6,216,527 B1 | | 4/2001 | Beecham et al. |
| 6,236,940 B1 | | 5/2001 | Rudow et al. |
| 6,237,098 B1 | | 5/2001 | Libicki |
| 6,384,709 B2 | * | 5/2002 | Mellen et al. ............... 340/5.2 |

FOREIGN PATENT DOCUMENTS

EP          1031480 A1  *  8/2000

* cited by examiner

Primary Examiner—Toan N Pham
(74) Attorney, Agent, or Firm—McNair Law Firm, P.A.

(57) ABSTRACT

This invention relates to the control of rental vehicles that are operated on a pay for usage basis. With this invention, operation of a vehicle is limited to those that have either paid for its use, or those that must have access to it for the purpose of maintaining it. Central to this invention is the integration of the Point of Sale payment process with the golf cart operation through the use of a readily available portable electronic messenger commonly known as an iButton.

11 Claims, 4 Drawing Sheets

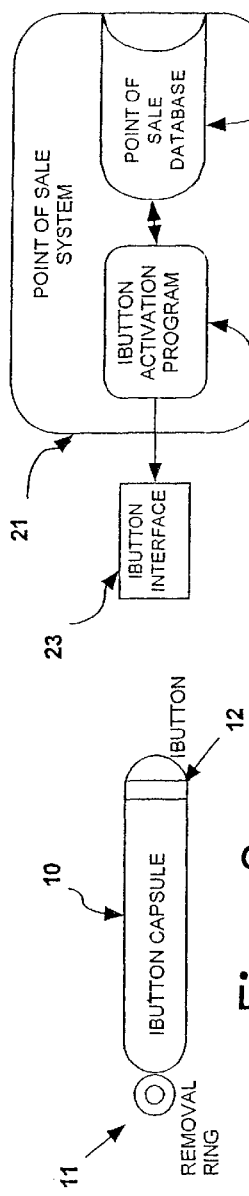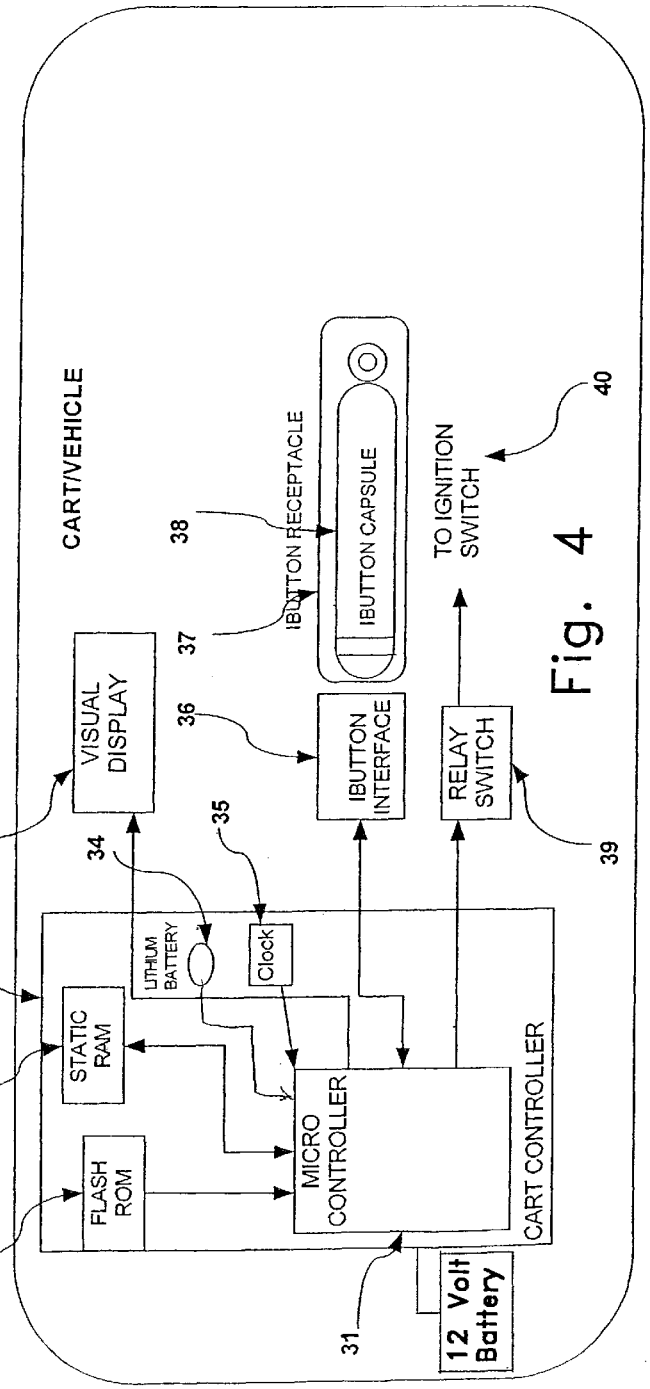

GOLF CART KEYLESS CONTROL SYSTEM

BACKGROUND OF THE INVENTION

In the golf industry, access to a motorized Golf Cart vehicle provides access to the entire golf course and its related facilities. Since most golf courses do not have a person checking each golfer to verify that they have a valid receipt of payment, it is a simple matter to obtain a golf cart without paying and to play a round of golf. For those golf courses that do employ a part-time or full-time "starter" for this primary purpose, this invention would eliminate the labor expense involved in this manual verification.

The open nature of a golf course makes it simple to bypass its pay for use policy. On most golf courses, one only needs a key to a golf cart to ride and play for free. There are several ways that golf carts are accessed without paying:

1. golf carts ready for use are commonly staged with keys and ready to go.
2. returned golf carts are left for some time with keys.
3. cashiers may provide keys to people they know.

Specifically, this invention will help prevent the loss of revenues caused by non-paying users of a golf course by utilizing an electronic system that prevents the operation of a golf cart unless it has been paid for.

SUMMARY OF THE INVENTION

The components of the invention include:

1. a reusable iButton for each golf cart driver packaged in a cylinder that contains the required activation information for the Golf Cart Controller. The iButton acts as a portable electronic messenger that carries with it the length of time that the vehicle may be used.
2. a Golf Cart Controller in each Golf Cart that reads and disables the iButton when inserted into its slot. The Golf Cart Controller activates a power relay for the time period specified in the Button enabling the cart to function and provides visual feedback through a Visual Display panel.
3. a Power Relay that is engaged by the Golf Cart Controller. The Power Relay, when engaged, will create a connection between the golf cart battery and the ignition system.
4. an Activation Software Program that will activate an iButton with the proper time value only when the sale transaction is completed at the Point of Sale System.

The invention is directed to a control system for controlling the operational time of rental vehicles which includes an activating unit which is reprogrammable. Also, a receptacle is provided within the vehicle for receiving the activating unit and accessing the program therefrom.

The controller is operative to determine whether the accessed program is in the Administrative Mode or the User Mode. The User Mode is designed for use with renters and basically activates the power system of the vehicle for vehicle use of a designated number of hours. The User Mode also activates a visual screen which among other things indicates the amount of operational time remaining and the number of renters. The controllers, upon determining the operational mode is User, erases the setting of the activating unit.

The Administrative Mode is programmed in the activating unit for use by maintenance personnel and for special occasions which require simultaneous operation of a plurality of vehicles. Activation timers may vary between a few minutes and several hours. The program contained in the activating unit is not erased when the controller is in the Administrative Mode. This gives a single activating unit the ability to activate an unlimited number of vehicles without being re-programmed.

Preferably the activating unit is an iButton.

An activation system is provided to program the settings in the activating unit. The activation system is manually controlled between the User Mode program and the Administrative Mode program. The activation system also is controlled to program the number of hours and the number of renters into the activating unit.

The invention has as its primary object the control of use of rental vehicles.

Another object of the invention is to ensure the authorized use of rental vehicles.

Another object of the invention is to provide a record of use time and users of the rental vehicle.

Another object of the invention is to provide a system which assures collection of appropriate revenue for the use of rental vehicles.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is a graphical view of the packaged iButton physical appearance;

FIG. 3 is a block diagram of the iButton interface to the Point of Sale System;

FIG. 4 is a block diagram of the Vehicle Controller, Visual Display and Relay;

DESCRIPTION OF A PREFERRED EMBODIMENT

Referring now in more detail to the drawings, the invention will now be described in more detail.

Figure 1:
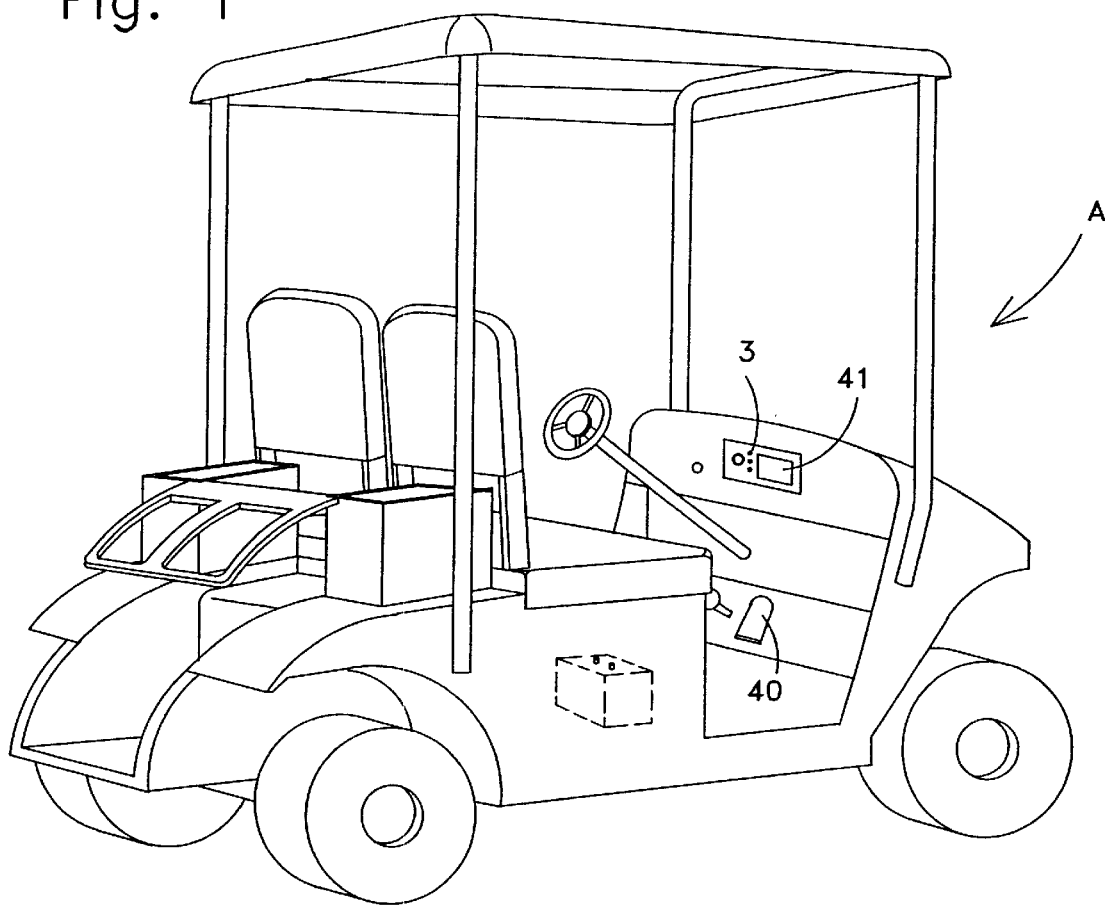
FIG. 1 is a perspective view of a golf cart incorporating the controller of the invention.

FIG. 1 shows a typical golf cart A in which the control system of the invention is installed. Normally the control system is incorporated with the electrical system of the golf cart with receptacle unit 37 being secured with the front panel in position to be accessed and seen by the driver. Ignition switch 40 may be eliminated if desired.

Figure 1A:
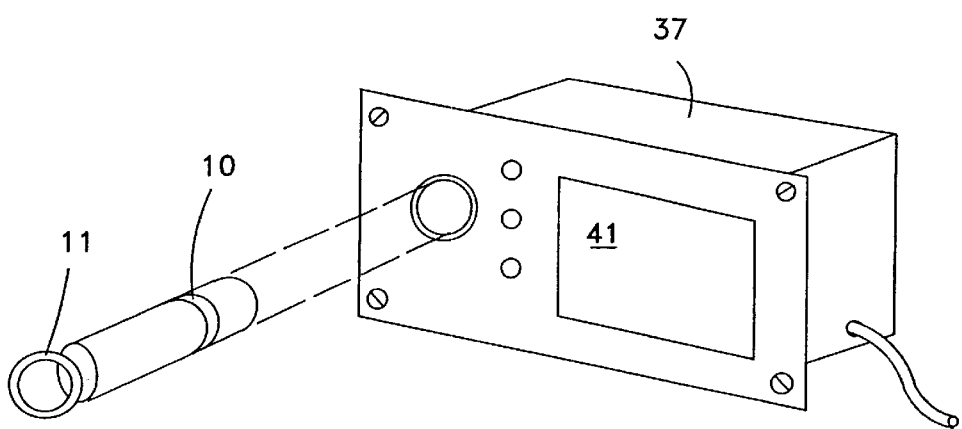
FIG. 1A is an exploded perspective view of the display panel and the iButton receptacle.

As shown in FIG. 1A receptacle 37 includes the cavity for receiving iButton 10 and Visual Display 41 which indicates the number of paid passengers and the time remaining for the cart to be activated.

The system could be modified to display other information if desired.

FIG. 2 shows the physical appearance of the iButton Capsule 10 that serves as the portable electronic messenger or activating unit.

The iButton 12 itself is a readily available device and is attached at the end of the iButton Capsule. The iButton Capsule 10 is packaged to allow it to be easily inserted by the vehicle operator into the vehicle console iButton Receptacle 37; FIG. 3. Once inserted, the iButton Capsule 10 cannot be easily removed without using a retractor tool not shown but common in the industry to attach to the Removal Ring 11. This protects against the casual loss and theft of the iButton Capsule 10.

FIG. 3 shows the iButton Activation Program 22 as part of the Point of Sale System 21. The Point of Sale System 21 may be operating any one of a number of common software packages. The iButton Activation Program 22 accesses transaction data in the Point of Sale System 21 to determine how many iButton Capsules 10 to activate, the length of activation time and the number of persons.

The iButton Interface 23 is a readily available device designed to allow programming and reading of the iButton 12. Together, these components enable the activation of an iButton Capsule 10 into one of two modes;

(1) an Admin Mode which can be set with short or long time values, or (2) a User Mode which is set for full or half time operation.

The Admin Mode short or long time values as well as the User Mode full and half-time values can be setup in the iButton Activation Program 22.

The iButton Capsule 10 when activated in the Admin Mode with a short time value is used by vehicle maintenance personnel to move vehicles when necessary. The nature of the short time value protects against the unauthorized use of the vehicle for playing golf. The iButton Capsule 10 when activated in the Admin Mode with a long time value is used by management to enable vehicles for tournament play and for other instances where it is inconvenient to activate iButton Capsules 10 at the Point of Sale System 21. When the iButton Capsule 10 is activated in the Admin Mode the system does not deactivate it when used in a vehicle. This allows maintenance personnel to move a plurality of vehicles with a single activated iButton.

The iButton Capsule 10 activated in User Mode is activated for either Full time operation for 18 holes of golf or Half time operation for 9 holes of golf. The iButton Capsule 10 activated in User Mode is recognized as such and is deactivated when used in the vehicle. This protects the iButton Capsule 10 from being reused on another vehicle without reactivation.

The iButton capsule 10 when activated for either full or half-time operation can also be activated to indicate the number of paid passengers and to recall customer date such as name, date of use, etc. This ability provides access to the customer for the return of items left in the cart or, in the event of damage to the cart, additional charges.

It is also contemplated that the iButton could be programmed to record the player scores which could then be retrieved after play.

FIG. 4 shows the components which physically reside in the vehicle. The Cart Controller 30 is composed of: (1) a Microcontroller 31, (2) Flash ROM 32, (3) Static RAM 33, (4) a Lithium Battery 34, and (5) a Clock 35. The Cart Controller 30 primary power source comes from a 12V battery that resides in the vehicle.

The Microcontroller 31 executes the program contained in the Flash ROM 32 and stores information related to the operation of the vehicle in the Static RAM 33. The Microcontroller 31 provides the activation signal to the Relay Switch 39 that enables the vehicle to operate and provides operational information to the Visual Display 41. The Lithium Battery 34 provides battery backup to the clock in the event that primary power is unavailable. The Clock 35 provides time of day information to the Microcontroller.

The iButton Receptacle 37 receives the iButton Capsule 38 for reading activation data and for deactivation of the iButton Capsule 38 when the User Mode is called for. The iButton Interface 36, a readily available device, provides the connection between the iButton Capsule 37 and the Microcontroller 31. The iButton does not need to remain in place for the vehicle to operate. Once the vehicle is activated for the time period specified in the iButton Capsule 10, this information is stored in the Static Ram 33 and the iButton Capsule 10 may be removed. This is significant for the purposes of the Admin Mode of operation where a vehicle maintenance person or management person may activate the vehicle and retain their iButton Capsule 10. In the User Mode, the iButton is deactivated once the vehicle is activated.

The Relay Switch 39 provides the connection between the vehicle's battery and activator or its ignition 40. The Relay Switch 39 is activated by the Microcontroller 31.

Figures 5, 6:
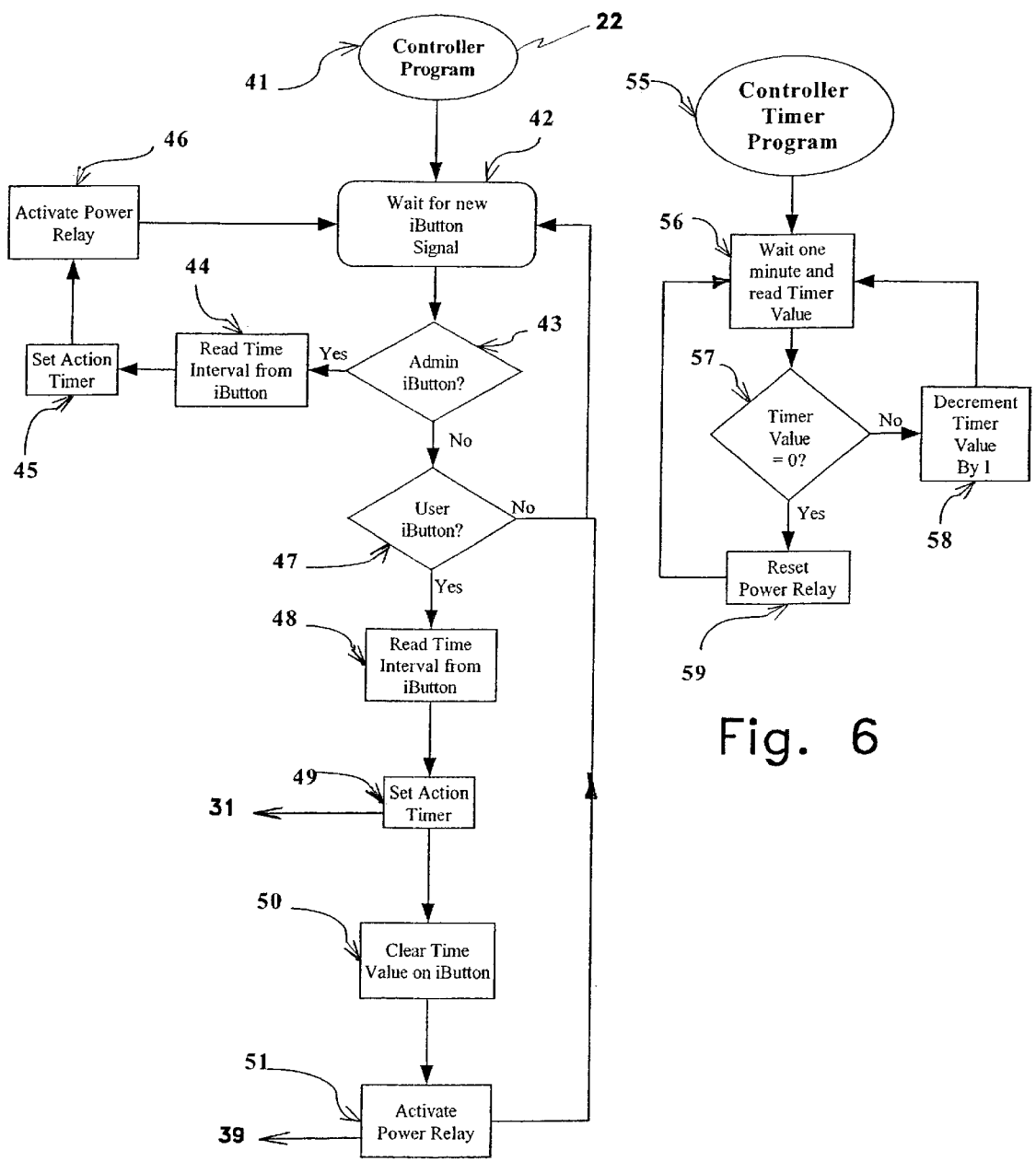
FIG. 5 is a flow chart of the Controller Program that resides in the Vehicle Controller.
FIG. 6 is a flow chart of the Controller Timer Program that resides in the Vehicle Controller.
Figure 7:
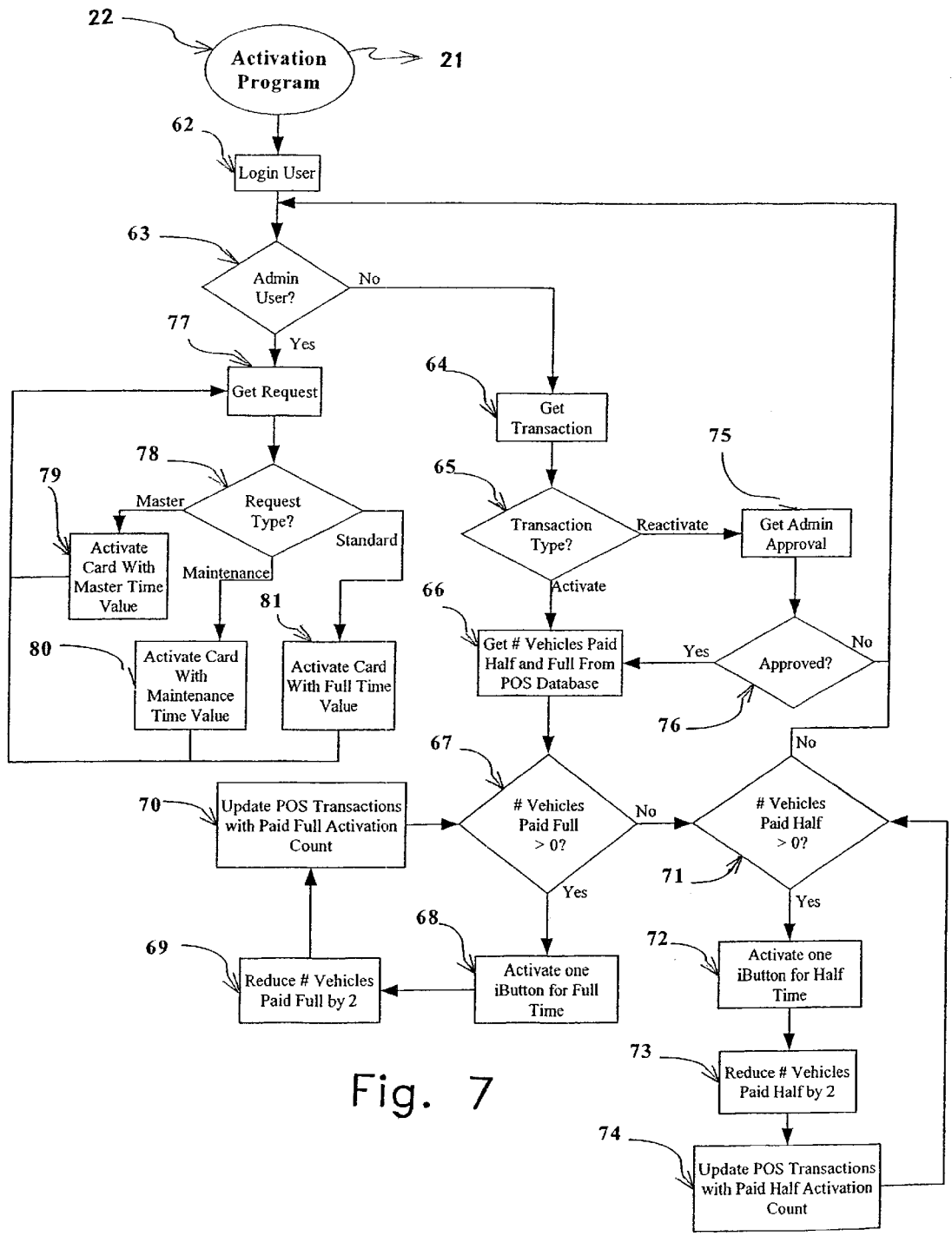
FIG. 7 is a flow chart of the Activation Program that interfaces with the Point of Sale System.

FIG. 5 shows the logic of the Controller Program 41. The Controller Program 41 resides in the Flash ROM 32 of the Cart Controller 30. Its purpose is to activate the Relay Switch 39 FIG. 3 when the proper conditions are met.

The Controller Program waits for new input at Block 42. When an iButton Capsule 10. is inserted into the iButton Receptacle 37 its contents are read and processed. Decision block 43 reads the iButton Capsule 10 and checks to see if it has been activated or not activated for Admin Mode. If it has been activated in the Admin Mode, then program flow proceeds to block 44 where the time interval is read from the Button Capsule 10. Program flow continues from block 44 to block 45 where the Action Timer is set in the Microcontroller 31 with the Time Value read from the iButton Capsule 10. Program flow then continues to block 46 where the Relay Switch 39 is activated which enables the vehicle to operate and the Visual Display 41 is updated to indicate the vehicle can be operated. Program flow then continues to block 42 where it waits for another iButton Capsule 10 to be received.

If at decision block 43, the iButton Capsule 10 mode is determined to not be Administrative Mode, then program flow continues to decision block 47. At validation or decision block 47, the iButton Capsule 10 is checked to see if it has been activated for User Mode. If it has not been activated for User Mode then it is an invalid iButton Capsule 10 and program flow returns to block 42 where it waits for a new iButton Capsule 10.

If decision block 47 detects that the iButton Capsule 10 mode is User Mode, then program flow continues to block 48 where the Time Value is read from the iButton Capsule 10. Program flow continues on to block 49 where the Action Timer is set in the Microcontroller 31 with the Time Value read from the iButton Capsule 10. Program flow continues to block 50 where the Time Value on the iButton Capsule 10 is disabled until the iButton Capsule 10 is activated again at the Point of Sale System 21. Program flow then continues from Time Value Block 50 to block 51 where the Relay Switch 39 is activated which enables the vehicle to operate and the Visual Display 41 is updated to indicate the vehicle can be operated and the number of passengers. Program flow then continues to block 42 where it waits for another iButton Capsule 10 to be received.

FIG. 4 shows the logic of the Controller Timer Program 55. The Controller Timer Program 55 also resides in the Flash ROM 32 of cart controller 30. Its purpose is to deactivate the Relay Switch 39; when the Time Value contained in Time Value Block 56 equals 0.

The Controller Time Program waits for one minute at Time Value Block 56. After one minute has expired, the Action Timer is read and program flow continues to decision block 57 where the value of the Action Timer is checked. If the Action Timer value is greater than 0, then program flow continues to block 58 where the Action Timer value is decremented by 1 and stored back in the Action Timer in the Micro-controller 31. Program flow then returns to block 56 to wait. If the Action Timer value is 0, then program flow continues to block 59 where the Relay Switch 39 is deactivated disabling the vehicle-from operation. The Visual Display 41 is updated to indicate the vehicle cannot be operated. Program flow then returns to block 56 to wait.

FIG. 5 shows the logic of the Activation Program 22. The Activation Program 61 resides in the Point of Sale System 21. Its purpose is to activate the iButton Capsule 10 with the proper Mode and Time Value. The Activation Program must be set up prior to use with the default values for:

Master Time Value—this value represents the amount of time that a cart will be activated for when a Master Type iButton is created in Admin Mode and would typically be set for 6 or more hours. An iButton so activated may be used to activate a number of carts for use for events such as golf tournaments.

Maintenance Time Value—this value represents the amount of time that a cart will be activated for when a Maintenance Type iButton is created in Admin Mode and would typically be set for several minutes. An iButton so activated may be used to activate carts for a brief period to move them and perform maintenance on them.

Full Time Value—this value represents the amount of time that a cart will be activated for when a User Type iButton is created for a full round, typically 18 holes, of golf.

Half Time Value—this value represents the amount of time that a cart will be activated for when a User Type iButton is created for a half round, typically 9 holes, of golf.

At block 62, the user login initializes the Activation Program 22. Program flow continues to decision block 63 where the program flow branches to block 77 if the user is determined to be Admin.

At block 77, the request type is retrieved from the Admin user and program flow continues to decision block 78 where if the Request Type is Master, then program flow continues to block 79 where the iButton Capsule 10 is activated in Admin Mode with the Master Time Value. Program flow then returns to block 77 to get the next request.

If the Request Type is Maintenance, then program flow continues to block 80 where the iButton Capsule 10 is activated in Admin Mode with the Maintenance Time Value. Program flow then returns to block 77 to get the next request.

If the Request Type is Standard, then program flow continues to block 81 where the iButton Capsule 10 is activated in User Mode with the Full Time Value. Program flow then returns to block 77 to get the next request. There is no verification with the Point of Sale system when User Mode iButton Capsules are activated in this manner. This may be used when circumstances prevent access to the Point of Sale System or in a standalone mode when there is no Point of Sale System to interface with.

At decision block 63, the program flow branches to block 64 if the user is determined to be Admin. At block 66, the Transaction Type is retrieved from the user and program flow continues to decision block 65 where if the Transaction Type is Activated, then program flow continues to block 66 where the number of vehicles which have been paid for and whether they are for Full (18 holes typically) or Half (9 holes typically) is retrieved from the Point of Sale Database 23.

Program flow continues to decision block 67 where a program loop performs the following steps until the number of iButton Capsules 10 activate for Full Time usage is equal to the total number of paid transactions divided by two and rounded up. It is done this way because two people maximum occupy a golf cart. For example, if two Full Time usage payments were made, one iButton Capsule 10 is activated. If three Full Time usage payments were made, two iButton Capsules 10 are activated. Any other type of combination must be activated by an Admin user.

68. One iButton is activated with the Full Time Value.

69. The number of remaining paid Full Time usage transactions is reduced by two.

70. The Point of Sale Database 23 is updated with the Full Time Activated Count.

Upon completion of the program loop defined by blocks 67–70, program flow proceeds to decision block 71 where a similar program loop, defined by blocks 71–74, is executed until the number of iButton Capsules 10 activate for Half Time usage is equal to the total number of paid transactions divided by two and rounded up.

72. One iButton is activated with the Full Time Value.

73. The number of remaining paid Half Time usage transactions is reduced by two.

74. The Point of Sale Database 23 is updated with the Half Time Activated Count.

Upon completion of the program loop defined by blocks 71–74, program flow proceeds to block 64 where the next transaction is received.

While the vehicle control system has been described using the iButton other known systems could be adapted to provide the same accounting for and operational control herein disclosed. Examples of such other type systems are those using the magnetic stripe, the smart card, radio frequency devices and global satellite positioning (GPS).

While a preferred embodiment of the invention has been described using specific terms, such description is for illustrative purposes only, and it is to be understood that changes and variations may be made without departing from the spirit or scope of the following claims.

What is claimed is:

1. A keyless control system for controlling operational time for rental vehicles comprising:

a receptacle within said vehicle for receiving an activating unit;

said activating unit having reprogrammable programs including an Administrative Mode program and a User Mode program;

a controller controlling operation of said vehicle, said controller retrieving said program from said activating unit and being operative to determine between said Administrative Mode and said User Mode programs; wherein;

in said Administrative Mode said activating unit remains programmed and said controller sets an operational time between a multiple of time limits for said vehicle and in said User Mode said controller deprograms said activating unit and sets operational time between two pre-set time limits for said vehicle.

2. The control of claim 1 wherein said activating unit is an iButton.

3. The control of claim 1 wherein said activating unit when programmed to activate said controller into said User Mode said pre-set time limits comprise hours separated by a multiple of two.

4. The control of claim 1 wherein said control system includes a visual screen, said controller being operative to cause visual information to appear on said screen.

5. The control of claim 1 wherein said activating unit is an iButton, and said control system includes a receptacle secured with said vehicle for receiving said iButton and retrieving said program.

6. The control of claim 1 wherein said controller deactivates said vehicle upon expiration of said operational time.

7. The control system of claim 1 wherein said activating unit includes an accounting system recording the number of hours credited to said activating unit and the number of purchasers of activation time for each said activating unit.

8. The control system of claim 1 wherein said controller includes system for actuating an ignition switch and a display screen for said vehicles.

9. The control system of claim 1 wherein said activating unit may be programmed to include and retain customer data and cart data, said customer and cart data being recallable.

10. A method for controlling the use of a golf card including:

providing an activating unit and programming said activating unit between a User Mode program and an Administrative Mode program;

providing said golf cart with a controller operative to allow operational systems to function;

causing said controller to be programmed by said activating unit between said Administrative Mode wherein said controller is set between a multiple of operational time limits and a said User Mode wherein said controller is set between two pre-set time limits, causing said activating unit to become de-activated upon programming said controller in the User Mode; and, causing said activating unit to remain activated when programming said controller in the Administrative Mode.

11. The method of claim 10 wherein said method includes providing a programming unit for programming said activating units and causing said programming unit to record the number of programs programmed on said activating units on and the number of users purchasing each program.

* * * * *